Feb. 2, 1960 R. B. HOTCHKISS ET AL 2,923,208
BEAD CUTTER MOUNTING FOR INSIDE BEAD TRIMMER
Filed June 13, 1956 2 Sheets-Sheet 1
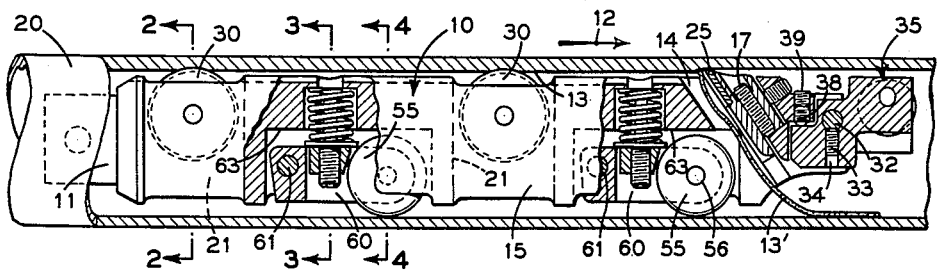
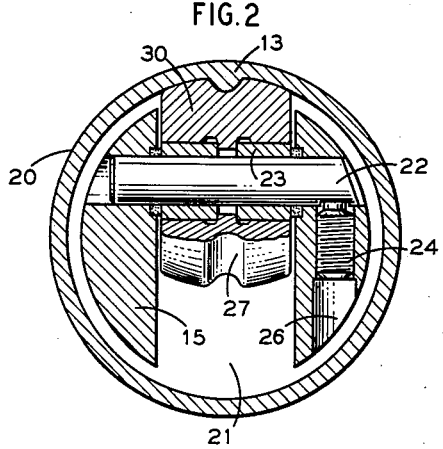 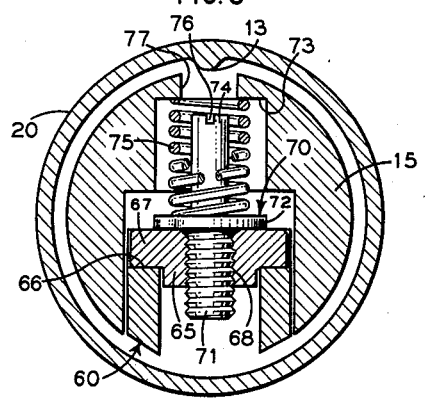
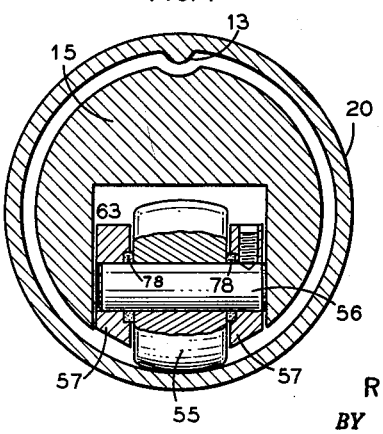
INVENTORS
Robert B. Hotchkiss
Charles L. Crist
BY
ATTORNEY Feb. 2, 1960   R. B. HOTCHKISS ET AL   2,923,208
BEAD CUTTER MOUNTING FOR INSIDE BEAD TRIMMER
Filed June 13, 1956   2 Sheets-Sheet 2
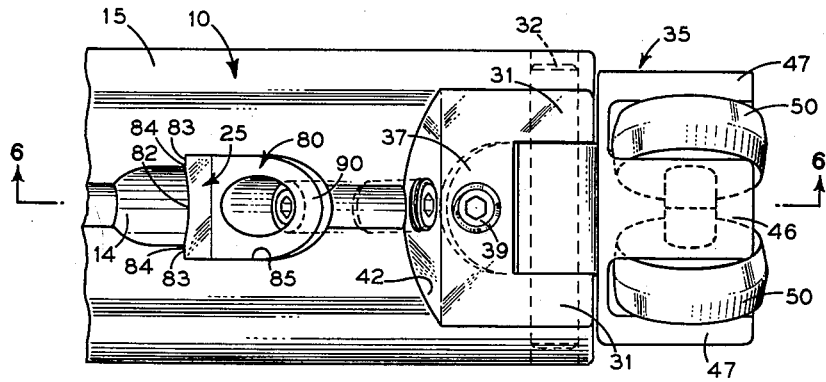
FIG. 5
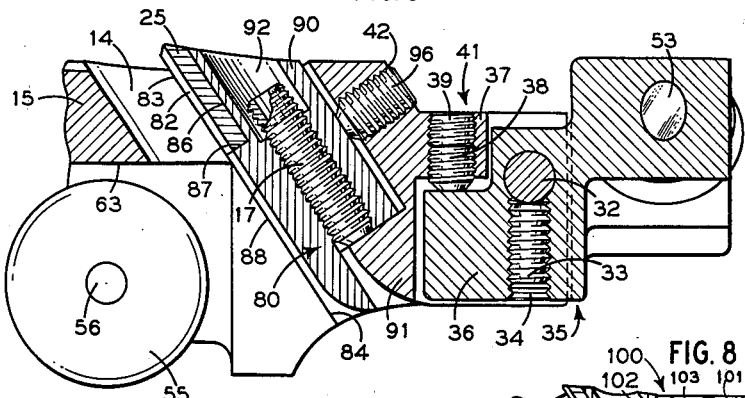
FIG. 6
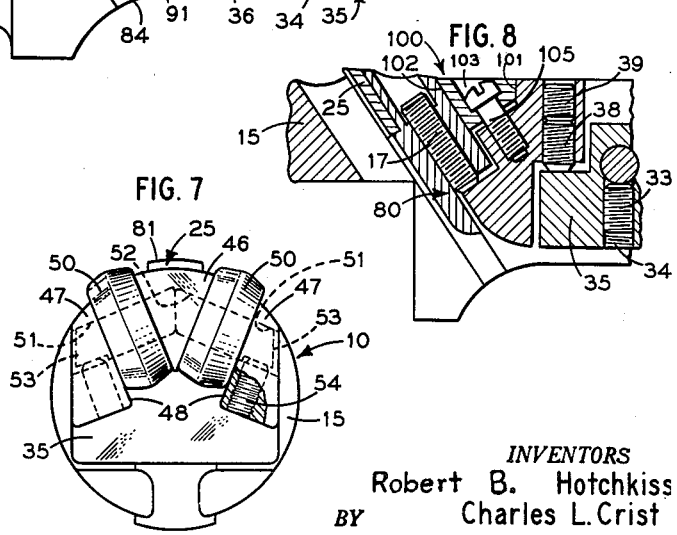
FIG. 8
FIG. 7
INVENTORS
Robert B. Hotchkiss
Charles L. Crist
BY
ATTORNEY – # United States Patent Office 2,923,208
Patented Feb. 2, 1960

2,923,208

BEAD CUTTER MOUNTING FOR INSIDE BEAD TRIMMER

Robert B. Hotchkiss and Charles L. Crist, Alliance, Ohio, assignors to The Babcock & Wilcox Company, New York, N.Y., a corporation of New Jersey Application June 13, 1956, Serial No. 591,096

2 Claims. (Cl. 90—24)

This invention relates to inside bead trimmers and, more particularly, to a bead trimmer having an improved and more efficient mounting for a bead cutting tool.

In the manufacture of resistance welded tubing, the electrically heated skelp edges are forced together to form the seam weld, and in this process, there is extrusion of metal inwardly and outwardly of the tube. This extrusion forms ridges usually known as beads, and their thickness and conformation varies with the tube size, the wall thickness and welding conditions. To make an acceptable product, these beads must be removed, and it is, in many cases, particularly important that the inside bead be accurately and completely removed so that the tubing may have a smooth cylindrical bore.

The inside bead is usually removed by a device known as an inside bead trimmer. Most frequently, such a trimmer takes the form of an elongated body arranged to fit within the formed and welded tubing and having rollers engaging the inside surface of the tubing. This trimmer is usually mounted in the tubing downstream from the welding point, and carries a hardened cutter engageable with the inside bead while the latter is still somewhat in a plastic condition. This cutter thus strips the inside bead from the inner surface of the tubing, leaving the inner surface smooth.

It is important, in the use of such bead trimmers, that the depth of cut be accurately pre-set and maintained in order to achieve a uniformly smooth inner surface of the tubing. For efficient operation, it is also desirable that the cutting tool have as long a life as possible, and that the adjustment means therefor be readily accessible so that there will be no prolonged interruption of the tubing production operation in the event the cutting tool gets out of adjustment.

In prior art bead trimmers, it has been customary to secure the cutting tool, which is usually a hardened material such as tungsten carbide, in position by brazing it to a suitably adjustable tool holder. This brazing of the carbide tip to the tool holder very often imparted thermal stresses to the cutting tool, resulting in a shortening of the life of the tool. In addition, the expense of the holder and of the brazing of the cutting tool thereto are comparatively high.

In accordance with the present invention, a tungsten carbide cutting tool is seated in a recess in a support block but is only mechanically positioned therein and is not brazed or otherwise secured to the support block. This provides for the cutting tool to be used in its original condition without the imparting of thermal stresses thereto. By suitable clamping means, the support block is fixedly positioned so that it holds the cutting tool firmly in its proper position.

In further accordance with the present invention, the adjustment means for properly positioning the support block and its mechanically mounted cutting tool, as well as the means for locking the support block and cutting tool in such adjusted position, are readily accessible from the top of the bead trimmer. Also, adjustment means, for positioning of a pair of tail rolls downstream of the cutting tool, are readily accessible from the top of the bead trimmer. This ready accessibility of the various adjustment means facilitates ready adjustment of critical clearances to thereby prevent any undue delay in the production of tubing.

For an understanding of the invention principles, reference is made to the following description of typical embodiments thereof as illustrated in the accompanying drawings. In the drawings:

Fig. 1 is a longitudinal elevation view, partly in section, of the invention bead trimmer, showing it in operative relation inside electric resistance welded tubing;

Figs. 2, 3 and 4 are transverse vertical sectional views on the correspondingly numbered lines of Fig 1;

Fig. 5 is an enlarged partial top plan view of the trailing or down stream end of the bead cutter illustrating the mounting of the bead cutter and the top-accessible adjusting means;

Fig. 6 is a sectional view on the line 6—6 of Fig. 5;

Fig. 7 is a rear or trailing end elevation view of the bead trimmer; and

Fig. 8 is a partial longitudinal sectional view illustrating a modified form of clamping arrangement for the tool support.

Referring to Figs. 1 through 4, the invention bead trimmer 10 comprises an elongated preferably cylindrical body 15 of a diameter somewhat smaller than the inside diameter of tube 20. The bead trimmer is held stationary by means of a connection to the coupling 11 at the upstream end of body 15, and the welded tube 20 moves to the right in the direction of the arrow 12. As the tube is welded along the top longitudinal seam, there remains a small flash or bead 13 extending into the tube. The part of this bead which protrudes through the tube is cut off by the cutting element or cutting tool 25 of bead trimmer 10, the severed bead portion 13' passing downwardly through on opening 14 in body 15 in advance or upstream of cutting tool 25.

Body 15 is provided with a pair of openings 21 extending vertically therethrough, one of these openings being adjacent coupling 11 and the other being substantially midway of the length of body 15. Openings 21 act as mounting enclosures for upper guide rollers 30. Each of these rollers is rotatably mounted on shaft 22 through the medium of sealed bushings 23. Shaft 22 is locked against axial movement by a set screw 24 accessible through a recess 26 in the side surface of body 15. Each roller 30 is formed with a circumferential groove 27 providing guiding contact with bead 13. The rollers 30 thus act to maintain the body 15, and particularly the cutting tool 25, accurately aligned with bead 13.

Extending from the downstream end of body 15 are a pair of spaced ears 31 which receive a pintle or hinge shaft 32 for a tail roll supporting block 35. This block has a close fit between the ears 31, as best seen in Fig. 5, and a set screw 33 threaded into a vertical passage 34 intersecting the passage receiving pintle 32, locks the pintle against axial movement. Block 35 has an extension 36 projecting forwardly of pintle 32 beneath a ledge 37 between ears 31. Extension 36 is engaged by a tail roll adjusting set screw 38 threaded through ledge 37 and engaged by a locking set screw 39. The upper surfaces of ears 31 and of the part of block 35 therebetween are cut away to form a recess 41 having a sloping forward wall 42, recess 41 allowing ready access to screws 38, 39. Adjustment of screw 38 swings block 35 about pintle 32 to adjust the tube engaging position of the tail rollers 50.

Projecting rearwardly from the downstream end of block 35 adjacent the upper end thereof is a rib 46 which is sector-shaped in cross-section. On either side of rib 46, and in equally spaced relation thereto, are ribs 47 which are trapezoidal in section. The inner faces 48 of ribs 47 are each parallel to a straight face of rib 46.

Passages 51 are formed through each rib 47, these passages being perpendicular to the inner faces 48 and each coaxial with one of a pair of intersecting passages 52 in the central rib 46. Each pair of passages 51—52 receives a shaft 53 of hardened or hard wear-resistant material, these shafts having bevelled inner mating ends which fit against each other in the rib 46 as best seen in Fig. 7. The shafts 53 are held in position by set screws 54 each threaded into a passage in a rib 47 intersecting the passage 51 therein. Each shaft 53 supports a tail roller 50 of hard, wear-resistant material, the angles of the shafts 53 being such that rollers 50 bear against the inner surface of the tube in equally spaced relation on either side from the weld-affected zone of the tube. The tail rolls 50 are thus rotatable in planes on opposite sides of and at equal acute angles to an axial plane including bead 13.

The body 15 of bead trimmer 10 is biased upwardly to maintain guide rollers 30, cutter 25, and tail rolls 50 firmly against the upper portion of the tubing by spring biased bottom supporting rolls 55, 55. Each bottom roll 55 is of hardened wear-resistant material and is rotatably mounted on a hard material shaft 56 mounted through the spaced parallel arms 57 of a U-shaped supporting bracket 60 hinged on a pintle 61. Pintles 61 are mounted in transverse passages in the body 15, each intersecting a bottom opening recess 63, 63 receiving one of the bottom roll supporting assemblies.

Referring to Figs. 1, 3 and 4, the upper surfaces of arms 57 of brackets 60 are arcuately notched, as at 66, to cooperatively receive a bridge member 65 having trunnions 67 lying in the notches 66. Each bridging member 65 has a threaded passage 68 extending upwardly therethrough and adjustably receiving a threaded stud 71 on a spring seat 70. Spring seat 70 includes a circular flange 72 forming a seat for a coil spring 75 seated in a recess 73 opening downwardly into each roller assembly recess 63 or 63'. An upwardly extending pin 74 on each spring seat 70 centers the coil spring 75 thereon, and the upper end of each pin 74 has a kerf 76 therein accessible through an opening 77 in the upper surface of body 15. Thereby, the compression of each spring 75 may be readily and easily adjusted by threading studs 71 along threaded passages 68.

To pre-set the desired depth of cut, the springs 75 are first adjusted to give the desired degree of upward thrust to the body 15, and screw 17 is adjusted to project cutter 25 the desired distance beyond the periphery of body 15. The adjusting screw 38 is then turned to accurately set the position of tail rolls 50 with respect to the upper edge of cutter 25 and with respect to the surfaces of guiding rollers 30 so that firm engagement of the guiding rollers 30 and the tail rolls 50 with the inner surface of tubing 20 will prevent cutter 25 taking too deep a cut as it removes or severs the bead 13. Assurance that the cut will be deep enough is provided by proper adjustment of the force of springs 75 biasing bottom rollers 55 downwardly.

It will be noted that one of the recesses 63, for the bottom roller assemblies is located between the recess 21 for the guide rolls 30, the other recess 63' is so located that its associated bottom roller 55 is aligned substantially directly beneath the cutting edge of tool 25, as may be best seen in Fig. 2 so that a directly upward thrust is provided substantially in alignment with the cutting edge of the tool. This further assures positive and accurate engagement of the cutter edge with the bead and to the desired depth of cut. Assurance of continued maintenance of the required depth of cut is further provided by making the tail rolls 50, the bottom support rolls 55, and the supporting shafts for these rolls of hardened, wear resistant material. Protection of the bottom rolls 55 against foreign material entering into the shaft assembly is provided by seals 78 between each bottom roll 55 and the associated bracket arms 57.

An important feature of the invention is the cutting tool 25 and its mounting and adjustment. Tool 25 is a substantially flat plate of suitable hard material, such as tungsten carbide, and has a convex outer or cutting edge 81, having a curvature conforming to the inner surface of tube 20, and a shallow concave recess 82 extending longitudinally of its forward face and providing transversely spaced bearing surfaces 83. These bearing surfaces 83 engage bearing shoulders 84 formed by the intersection of a downwardly and rearwardly sloping tool mounting recess 85 with "chip" opening 14.

Tool 25 is mechanically and removably positioned in a rectangular cross-section recess 86 in the forward face of a tool supporting block 80, the inner edge of tool 25 seating against a shoulder 87 forming the inner end of recess 86. The forward face of block 80, beneath recess 86, is shaped as a continuation of the forward face of tool 25, to provide bearing surfaces 88 engaging bearing shoulders 84.

Rearwardly of tool supporting recess 86, block 80 is formed with an elongated rib or the like 90 which is semi-oval in cross-section to conform to the semi-oval rear portion of recess 85, and is somewhat shorter than surfaces 88. A tool adjusting set screw 17 is threaded longitudinally through rib 90 to engage a shoulder 91 engageable with the inner end of rib 90, and is accessible, for adjustment purposes, through a top-opening cylindrical recess 92 in the upper end of rib 90. After adjustment of screw 17 to set the proper projection of the cutting edge 81 of tool 25, block 80 is locked in adjusted position by a locking set-screw 96 threaded through a passage intersecting recess 85 and accessible, for adjusting purposes, from surface 42 of recess 41. Screw 96 holds bearing surfaces 83 of tool 25, and 88, of block 80, firmly in engagement with bearing shoulders 84. The stress against cutting edge 81 is absorbed by the inner edge of tool 25 bearing against ledge 87.

Fig. 8 illustrates an alternative arrangement for clamping tool 25 and tool holder 80 in fixed position. In this arrangement, clamping of the tool holder and tool is effected by a wedge 100, which has a substantially vertical surface 101, engageable with a mating surface of body 15, and an upwardly and forwardly sloping surface 102, engageable with the mating rear or trailing surface of tool holder 80. Wedge 100 has a recess 103 in which is seated the head of a screw 105 threaded into body 15. When screw 105 is tightened, it draws wedge 100 inwardly to tightly clamp tool 25 and tool support 80 against surfaces 83.

While specific embodiments of the invention have been shown and described in detail to illustrate the application of the invention principles, it will be understood that the invention may be embodied otherwise without departing from such principles.

What is claimed is:

1. In an inside bead trimmer for severing a bead from the inner surface of a welded tube; said bead trimmer comprising an elongated body adapted to be disposed within the tube so as to permit relative longitudinal motion between the tube and the body; means supporting said body in the tube in fixed spatial relation to the bead; said body having an upwardly and forwardly sloping recess therein formed with upwardly and forwardly sloping, rearwardly facing laterally spaced bearing surfaces; a tool support mounted in said recess and movable along said bearing surfaces, said support having a tool receiving recess in its upper end opening upwardly and toward said bearing surfaces; a ledge extending to said body recess toward said bearing surfaces; a bead severing tool removably seated in said tool receiving recess and engaging said bearing surfaces, and having a cutting edge projecting from said body into severing relation with said bead; an upwardly opening threaded aperture in said tool support receiving an adjustment screw engaging said ledge to adjust said support along said bearing surfaces to adjust the projection of said cutting edge from said body; means clamping said tool support against said bearing surfaces to maintain the adjustment of said tool; a tail roll support pivotally mounted intermediate its ends on said body downstream of the cutter for swinging movement in a plane through the longitudinal axis of the tube and the bead; tail rolls rotatably mounted on the outer end of said support and engageable with the tube surface on either side of the bead; said tail roll support having a portion extending inwardly from its pivotal axis beneath an overlying part of said body; and an adjustment screw threaded through said body part and engaging said tail roll support portion to adjust the position of said tail rolls; said last-named screw being accessible from the upper surface of said body.

2. In an inside bead trimmer for severing a bead from the inner surface of a welded tube; said bead trimmer comprising an elongated body adapted to be disposed within the tube so as to permit relative longitudinal motion between the tube and the body; means supporting said body in the tube in fixed spatial relation to the bead; said body being formed with a recess therein, a pair of laterally spaced upwardly and forwardly sloping, rearwardly facing bearing surfaces on opposite sides of said recess; a tool support mounted in said recess, movable along and engaging said bearing surfaces, said support having a carbide cutting tip receiving recess in its upper end opening upwardly and opening forwardly toward said bearing surfaces; a carbide cutting tip removably seated in said receiving recess and engaging said bearing surfaces, and having a cutting edge projecting from said body through said upward opening into severing relation with said bead; adjustment means cooperable with said support and said body to adjust said support along said bearing surfaces to pre-set the projection of said cutting edge from said body; and means, including said support, forcing said carbide cutting tip toward said bearing surfaces to clamp said carbide cutting tip against said bearing surfaces and to lock said support in adjusted position.

References Cited in the file of this patent

UNITED STATES PATENTS

| | | |
|---|---|---|
| Re. 20,439 | Rippel | July 6, 1937 |
| 1,912,419 | Whitman | June 6, 1933 |
| 2,202,914 | Jones et al. | June 4, 1940 |
| 2,237,550 | Darner | Apr. 8, 1941 |
| 2,286,513 | Sower | June 16, 1942 |
| 2,567,167 | Drader | Sept. 11, 1951 |
| 2,573,295 | Allardt | Oct. 30, 1951 |
| 2,714,338 | Nance | Aug. 2, 1955 |

OTHER REFERENCES

Kennametal Inc. Catalog No. 54 (page 47 relied on), issued November 1953.